United States Patent
Jorda et al.

(10) Patent No.: US 11,225,576 B2
(45) Date of Patent: Jan. 18, 2022

(54) COMPOSITION COMPRISING ONE OR MORE PARTICULAR ADDITIVES

(71) Applicant: ARKEMA FRANCE, Colombes (FR)

(72) Inventors: Eric Jorda, Lyons (FR); Sandrine Ligier, Grigny (FR); Vincent Luca, Solaize (FR); Isabelle Birken, Serezin du Rhône (FR)

(73) Assignee: Arkema France, Colombes (FR)

( * ) Notice: Subject to any disclaimer, the term of this patent is extended or adjusted under 35 U.S.C. 154(b) by 336 days.

(21) Appl. No.: 16/335,023

(22) PCT Filed: Sep. 14, 2017

(86) PCT No.: PCT/FR2017/052451
§ 371 (c)(1),
(2) Date: Mar. 20, 2019

(87) PCT Pub. No.: WO2018/055261
PCT Pub. Date: Mar. 29, 2018

(65) Prior Publication Data
US 2019/0249010 A1  Aug. 15, 2019

(30) Foreign Application Priority Data
Sep. 22, 2016 (FR) .................................. 1658913

(51) Int. Cl.
| | |
|---|---|
| *C08L 95/00* | (2006.01) |
| *C08K 5/1539* | (2006.01) |
| *C08K 5/5317* | (2006.01) |
| *C08K 5/42* | (2006.01) |
| *C08K 5/092* | (2006.01) |
| *C08K 5/00* | (2006.01) |

(52) U.S. Cl.
CPC .......... *C08L 95/005* (2013.01); *C08K 5/0008* (2013.01); *C08K 5/092* (2013.01); *C08K 5/1539* (2013.01); *C08K 5/42* (2013.01); *C08K 5/5317* (2013.01); *C08L 2555/28* (2013.01); *C08L 2555/52* (2013.01); *C08L 2555/60* (2013.01)

(58) Field of Classification Search
CPC ....... C08L 95/005; C08L 95/00; C08K 5/092; C08K 5/5317; C08K 5/1539; C08K 5/42
See application file for complete search history.

(56) References Cited

U.S. PATENT DOCUMENTS

| 5,096,495 A | 3/1992 | Schilling et al. |
| 2011/0041728 A1 | 2/2011 | Godivier et al. |

FOREIGN PATENT DOCUMENTS

| EP | 0179510 A1 | 4/1986 |
| EP | 1057873 A1 | 12/2000 |
| FR | 2930253 A1 | 10/2009 |
| WO | 2005012433 A1 | 2/2005 |

OTHER PUBLICATIONS

Xin et al., ACS Sustainable Chem. Eng., (2016), V.4, p. 2754-2761.*
Gasthauer, E., et al., "Characterization of asphalt fume composition by GC/MS and effect of temperature," Jun. 2008, pp. 1428-1434, vol. 87, Issue 7, Fuel, ScienceDirect.
Bowman, D.T., et al., "Identification of individual thiophene-, indane-, tetralin-, cyclohexane-, and adamantane-type carboxylic acids in composite tailings pore water from Alberta oil sands," Aug. 14, 2014, pp. 2075-2083, vol. 28, Issue 19, Rapid Communications in Mass Spectrometry.
Rahimi, P., et al., "Comparison of the reactivity of naphthenic acids in athabasca bitumenand San Joaquin Valley," Joint CCQTA/COQA Meeting, Feb. 10, 2010, XP002770137, Retrieved from the Internet: http://www.coqa-inc.org/docs/default-source/meeting-presentations/20100211_rahimi_athabasca_-napacids.pdf?sfvrsn=2 [retrieved on May 15, 2017].
International Search Report and Written Opinion for International Application No. PCT/FR2017/052451, dated Jan. 12, 2018, 8 pages.
Breuer, T.E., "Dimer Acids," Dec. 4, 2000, Encyclopedia of Chemical Technology, 1 page—(Abstract only).

\* cited by examiner

*Primary Examiner* — Yong L Chu
(74) *Attorney, Agent, or Firm* — RatnerPrestia

(57) ABSTRACT

Provided is a composition including at least one bitumen and at least one additive as defined herein. The composition provides emulsions of all types of bitumens, which can be used in the production of cold-poured mixes, having an improved internal strength and a rapid increase in cohesion.

13 Claims, No Drawings

COMPOSITION COMPRISING ONE OR MORE PARTICULAR ADDITIVES

CROSS-REFERENCE TO RELATED APPLICATIONS

This is the national phase of International Application No. PCT/FR2017/052451, filed Sep. 14, 2017, which claims priority to French Application No. 1658913, filed Sep. 22, 2016. The disclosure of each of these applications is incorporated herein by reference in its entirety for all purposes.

FIELD OF THE INVENTION

The present invention relates to a composition comprising one or more particular additives, intended for the production of cold-poured mixes.

DESCRIPTION OF THE BACKGROUND

In the field of the road industry, bituminous coatings are generally produced according to two techniques: "hot" techniques, in which the bitumen is brought to high temperatures (typically 150° C.-170° C.), and "cold" techniques, based on the use of aqueous-phase bitumen emulsions, at much lower temperatures (typically 30° C.-60° C.).

These bitumen emulsions are commonly used for various road applications, in which they can be spread alone in order to obtain for example tie layers, impregnation layers and isolated repairs (seals, blocking up cracks, and the like), or in the presence of aggregates for producing surface coatings. They can also be mixed with aggregates for obtaining cold mixes, either just before being applied (cold-poured mixes or CPMs), or in the mixing plant (emulsion gravels, emulsified bituminous concretes, etc.).

It is, moreover, known practice to use various additives in bitumens in order to improve the performance thereof, to control the viscosity thereof, to adjust their degree of coating on mineral aggregates for forming mixes, and the like.

Among the additives commonly used in bitumens, surfactants at the current time have an absolutely predominant place in most techniques for producing bitumens and mixes:

for "hot" techniques, the surfactants may be added directly to the bitumen in order to improve the adhesiveness properties of the bitumen on the aggregate, or in order to make it possible to obtain a mix at lower temperature ("warm" technology);

for "emulsion" techniques, recourse to one or more surfactants used as emulsifying agents is necessary in order to form the emulsions.

With regard to the "emulsion" techniques, in which the bitumen is emulsified with an aqueous phase, a distinction is made between nonionic, anionic and cationic emulsions.

Nonionic emulsions use uncharged surfactants (emulsifiers) (of the type such as polyalkoxylated fatty alcohols, polyalkoxylated nonylphenols or other polyalkoxylated compounds, alkyl polyglucosides, and the like). The emulsion may be prepared at neutral, basic or acidic pH.

Anionic emulsions use anionic surfactants, that is to say emulsifiers bearing sulfate groups, sulfonate groups, carboxylate groups, and the like. Before the formation of the emulsion per se, the aqueous phase can be treated if necessary with a strong base in order to salify the acid functions, such that the surfactant, and consequently the droplets of bitumen in the emulsion, are negatively charged. In this case, the anionic emulsion has a basic pH.

Cationic emulsions use cationic surfactants, that is to say emulsifiers bearing amine functions, quaternary ammonium functions, and the like. Before the formation of the emulsion per se, the aqueous phase can be treated if necessary with a strong acid, such that the surfactant, and consequently the droplets of bitumen in the emulsion, are positively charged. In this case, the cationic emulsion has an acidic pH. When the surfactant is in the form of a quaternary ammonium salt, in which the nitrogen atom(s) are permanently positively charged, the resulting emulsion can thus be used without pH adjustment.

Currently, the vast majority of surfactants used to produce anionic bitumen emulsions are based on fatty acid and polyacid chemistry, such as for example Stabiram® EB sold by CECA S.A.

For cationic bitumen emulsions, the commercial surfactants are based on fatty polyamine and alkoxylated fatty polyamine chemistry, such as for example Dinoram® S, Dinoram® SL, Polyram® S and Polyram® SL sold by CECA S.A., and also products resulting from the condensation of fatty mono- or polyacids with polyethylenepolyamines or polyethanolamines, such as for example Émulsamine® L60, Émulsamine® L70 and Émulsamine® LZ sold by CECA S.A.

It is known to those skilled in the art that cationic emulsions result in good adhesion of the bitumen on acid aggregates, the surface of which is negatively charged (for example quartz, silicates, and the like). It should be noted that this is particularly true for amine surfactants which do not have quaternary ammonium functions. The water sensitivity of the latter then makes the bitumen/aggregate adhesion less robust.

In the general case of cold mixes, those applying the latter seek not only good coating of the aggregate by the bitumen, in all the steps of the process, but also good bitumen/aggregate adhesiveness properties, and also sufficient cohesion allowing the road to be quickly opened to traffic, without degradation (tearing off, cracking, and the like).

In the particular case of cold-poured mixes (CPMs), those applying the latter seek not only good bitumen/aggregate adhesiveness properties and a sufficient kneading time allowing correct laying down, but also fast setting of the mix.

According to the present invention, the expression "cold-poured mix (CPM)" is intended to mean a material prepared on site by specific machines such as those proposed by the company Breining, and laid down in the fluid state as described in the information bulletin from the SETRA (Service d'Études Techniques des Routes et Autoroutes) [Department of Technical Studies of Roads and Freeways], "Chaussées Dépendances" ["Road Surfaces and Related Constructions"], No. 102, June 1997. Another description of materials of this type can be found in the guidelines published in 2003 by the ISSA ("International Slurry Seal Association" in Annapolis, Md., USA). CPMs are intended herein to mean all the variants of this technique, such as bituminous slurries (also described in the bulletin from SETRA) and the international names such as "Microsurfacing" and "slurry seal".

All parameters otherwise being equal (aggregates and emulsifier system), it is known to those skilled in the art that a bitumen of naphthenic type allows a much faster increase in cohesion of the mix than a bitumen of paraffinic type. A distinction between naphthalenic bitumens and paraffinic bitumens can be made by measuring the content of carbonyl functions as indicated by E. Gasthauer et al., in "Fuel", 87, (2008), pages 1428-1434. Naphthalenic bitumens derived from petroleum crudes from Venezuela are for example sold in Europe by the company Nynas AB. In countries where naphthalenic bitumen is available, CPMs are thus produced with this type of bitumen, which allows the road to be reopened to traffic very quickly, typically as soon as 15 minutes to 30 minutes after spreading.

On the other hand, in countries where naphthalenic bitumens are unavailable or not widely available, and where CPMs are thus produced with paraffinic bitumens, the time taken to reopen the road to traffic is much longer, thereby making this technique less competitive. There remains a need for CPMs produced with paraffinic bitumens which can be used under the same conditions as CPMs produced with naphthalenic bitumens.

Even though the difference is less marked for the other types of cold mixes, the performance obtained with naphthalenic bitumens in terms of cohesion is greater.

Those applying the mixes are thus seeking a more robust solution which allows them not only to use cold mixes produced with paraffinic bitumens, but also to work with any type of bitumen, in particular for producing cold mixes, while at the same time preserving the same applicative properties, typically while allowing very fast reopening of the road to traffic.

International application WO 2005/012433 proposes a mixture for emulsions which contains an emulsifier (surfactant) and a de-emulsifier. This mixture develops a rapid rupture of cohesion and a rapid increase in cohesion. The term "rupture" is intended to mean the destabilization of the emulsion after separation of the water and the bitumen. The "increase in cohesion" results in hardening of the coating under the effect of the adhesive bonding of the granular structure by the bitumen released during the breaking of the emulsion The emulsifier is a salt of diamine with a polyvalent phosphoric acid. Polyphosphoric acid is more specifically mentioned. The de-emulsifier is cement-based. This solution has the disadvantage of having to carry out a salification with ortho-phosphoric acid, whereas hydrochloric acid is more widespread. In point of fact, many emulsion plants do not have several acid stores, and would like to have a solution that is independent of the type of bitumen and that can be used with hydrochloric acid.

U.S. Pat. No. 5,096,495 describes a "slurry seal" with an improved increase in cohesion through the combined use of a specific emulsifier and an additive introduced into the aggregate wetting water. The introduction of said additive into the aggregate wetting water is not very practical since it requires the machines to be adapted and can interfere with the use of the control additives which are commonly used in these techniques for providing flexibility in terms of workability in the field.

Moreover, patent FR 2 930 253 describes the improvement of the increase in cohesion with paraffinic bitumen by adding a polymerized fatty acid to the bitumen before emulsification.

The polymerized fatty acids are acids resulting from the polymerization of the side chains of at least one unsaturated fatty acid. The unsaturated fatty acids which make it possible to obtain polymerized fatty acids are unsaturated fatty acids having from 4 to 24 carbon atoms ($C_4$ to $C_{24}$), preferably from 11 to 22 carbon atoms ($C_{11}$ to $C_{22}$), more preferably from 16 to 18 carbon atoms ($C_{16}$ to $C_{18}$).

However, this solution requires the user to handle at least two additives: an emulsifier and a polymerized fatty acid (dopant). The user must therefore have recourse to a "doped" bitumen grade, and consequently must have a specific store dedicated to the application of CPMs, or else he must dope his bitumen before producing the emulsion. However, not all plants which produce bitumen emulsions are equipped with dedicated stores or with facilities for doping bitumen.

SUMMARY OF THE INVENTION

Thus, the first objective of the present invention is to do away with the drawbacks known from the prior art regarding cold-poured mixes, and in particular to make it possible to provide the final user with emulsions of all types of bitumens, which can be used in the production of cold-poured mixes, having an improved internal strength and a rapid increase in cohesion.

A subject of the invention is thus a composition comprising at least one bitumen and at least one additive chosen from the compounds of formula (I) below and the compounds of formula (II) below:

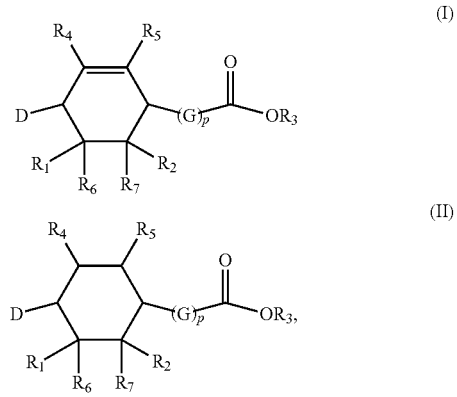

wherein:
$R_1$ and $R_2$, which may be identical or different, represent, independently of one another, a group chosen from a hydrogen atom, a group $-(A1)_{q1}-S(O)_2OR_8$, a group $-(A2)_{q2}-P(O)(OR_9)_2$ and a group $-(A3)_{q3}-C(O)OR_{10}$, $R_8$, $R_9$ and $R_{10}$, which may be identical or different, represent, independently of one another, a hydrogen atom or a linear or branched, saturated or unsaturated $C_1$-$C_{22}$ alkyl radical, A1, A2 and A3, which may be identical or different, represent, independently of one another, a linear or branched $C_1$-$C_4$, preferably $C_1$-$C_2$, more preferably $C_1$, alkylene radical.

q1, q2 and q3, which may be identical or different, represent, independently of one another, an integer equal to 0 or 1, or $R_1$ and $R_2$ form, with the carbon atoms to which they are attached, a heterocycle comprising 5 ring members, it being understood that $R_1$ and $R_2$ do not simultaneously represent a hydrogen atom;

$R_3$ represents a hydrogen atom or a linear or branched, saturated or unsaturated $C_1$-$C_{22}$ alkyl radical;

$R_4$ and $R_6$, which may be identical or different, represent, independently of one another, a hydrogen atom or a linear or branched, saturated or unsaturated $C_1$-$C_{22}$ alkyl radical;

$R_6$ and $R_7$, which may be identical or different, represent, independently of one another, a hydrogen atom or a linear or branched, saturated or unsaturated $C_1$-$C_4$, preferably $C_1$ or $C_2$ or $C_3$, alkyl radical;

D represents a hydrogen atom or a linear or branched, saturated or unsaturated $C_1$-$C_{22}$ alkyl radical;

G represents a linear or branched, saturated or unsaturated $C_1$-$C_{22}$ alkylene radical;

p is an integer equal to 0 or 1.

The composition according to the invention makes it possible to produce bituminous emulsions which have much better performance than those obtained under the same conditions without additive. These emulsions are of particular value with a view to their use for producing cold-poured mixes, since they confer, on said mixes, a very rapid increase in cohesion and improved water-resistance properties, regardless of the emulsifying system and the nature of the aggregates.

DETAILED DESCRIPTION OF THE INVENTION

It is specified that the expression "from . . . to . . . " used in the present description should be understood as including each of the limits mentioned.

In the present invention, the term "heterocycle" is intended to mean a cyclic structure comprising at least one heteroatom chosen from O, N and S.

In the present invention, the term "emulsion" is intended to mean a heterogeneous system comprising two or more liquid phases, consisting of a continuous liquid phase and at least one second liquid phase, dispersed in the first, in the form of fine droplets.

In the present invention, the term "bituminous emulsion" is intended to mean an aqueous dispersion of bitumen optionally comprising one or more additives, surfactants, emulsifiers, viscosifying agents, thickeners, fluxes, plasticizers and/or any other additive which makes it possible to adjust the properties of the emulsion.

The bitumens used in the present invention are bitumens from various origins. Mention may first of all be made of bitumens of natural origin, those contained in natural bitumen deposits, natural asphalt deposits, or tar sands.

The bitumens according to the invention are also bitumens originating from the refining of crude oil. The bitumens originate from the atmospheric and/or vacuum distillation of petroleum. These bitumens can optionally be blown, visbroken and/or deasphalted. The bitumens may be hard-grade or soft-grade bitumens. The various bitumens obtained by means of refining processes can be combined together to obtain the best technical compromise The bitumens used can also be bitumens fluxed by the addition of volatile solvents, of fluxes of petroleum origin, of carbochemical fluxes and/or of fluxes of plant origin.

Polymer-modified bitumens may also be used. As polymer, mention may for example, and by way of nonlimiting indication, be made of thermoplastic elastomers such as linear or star-branched styrene/butadiene (SBR, SBS) or styrene/isoprene (SIS) random or block copolymers, which are optionally crosslinked, ethylene/vinyl acetate copolymers, olefinic homopolymers and copolymers of ethylene (or propylene or butylene), polyisobutylenes, polybutadienes, polyisoprenes, poly(vinyl chloride), reground rubbers or else any polymer used to modify bitumens, and blends thereof. An amount of polymer of from 2% to 10% by weight relative to the weight of bitumen is generally used.

Synthetic bitumens, also known as clear, pigmentable or colorable bitumens, may also be used. These bitumens contain little or no asphaltene and can consequently be colored. These synthetic bitumens are based on petroleum resin and/or on indene-coumarone resin and on lubricating oil, as described for example in patent EP179510.

Advantageously, the bitumen is a bitumen with a penetrability, measured according to the standard NF EN 1426 of June 2007, ranging from 10 to 300, preferentially from 20 to 220, more preferentially from 70 to 220.

Preferably, the bitumen according to the invention is chosen from unmodified bitumens from the refining of crude oil.

The composition according to the invention comprises at least one bitumen and at least one additive chosen from the compounds of formula (I) below and the compounds of formula (II) below:

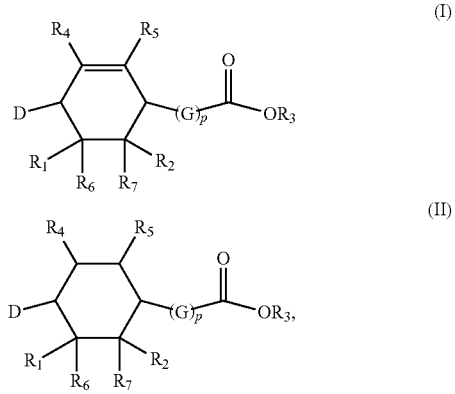

wherein:

$R_1$ and $R_2$, which may be identical or different, represent, independently of one another, a group chosen from a hydrogen atom, a group -(A1)$_{q1}$-S(O)$_2$OR$_8$, a group -(A2)$_{q2}$—P(O)(OR$_9$)$_2$ and a group -(A3)$_{q3}$-C(O)OR$_{10}$, $R_8$, $R_9$ and $R_{10}$, which may be identical or different, represent, independently of one another, a hydrogen atom or a linear or branched, saturated or unsaturated $C_1$-$C_{22}$ alkyl radical, A1, A2 and A3, which may be identical or different, represent, independently of one another, a linear or branched $C_1$-$C_4$, preferably $C_1$-$C_2$, more preferably $C_1$, alkylene radical.

q1, q2 and q3, which may be identical or different, represent, independently of one another, an integer equal to 0 or 1, or $R_1$ and $R_2$ form, with the carbon atoms to which they are attached, a heterocycle comprising 5 ring members, it being understood that $R_1$ and $R_2$ do not simultaneously represent a hydrogen atom;

$R_3$ represents a hydrogen atom or a linear or branched, saturated or unsaturated $C_1$-$C_{22}$ alkyl radical;

$R_4$ and $R_5$, which may be identical or different, represent, independently of one another, a hydrogen atom or a linear or branched, saturated or unsaturated $C_1$-$C_{22}$ alkyl radical;

$R_6$ and $R_7$, which may be identical or different, represent, independently of one another, a hydrogen atom or a linear or branched, saturated or unsaturated $C_1$-$C_4$, preferably $C_1$ or $C_2$ or $C_3$, alkyl radical;

D represents a hydrogen atom or a linear or branched, saturated or unsaturated $C_1$-$C_{22}$ alkyl radical;

G represents a linear or branched, saturated or unsaturated $C_1$-$C_{22}$ alkylene radical;

p is an integer equal to 0 or 1.

Preferably, said additive is of formula (I).

Advantageously, $R_1$ and $R_2$ form, with the carbon atoms to which they are attached, the group of formula (III) below:

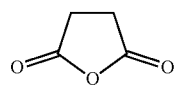

(III)

Advantageously, $R_8$, $R_9$ and $R_{10}$ denote the hydrogen atom.

According to one particular embodiment of the invention, $R_3$ denotes the hydrogen atom.

Preferentially, $R_4$ and $R_5$ simultaneously denote the hydrogen atom.

Preferably, $R_6$ and $R_7$, which may be identical or different, represent, independently of one another, the hydrogen atom, the methyl radical or the ethyl radical, more preferably $R_6$ and $R_7$ simultaneously denote the hydrogen atom.

Preferably, D represents a linear or branched, preferably linear, and saturated or unsaturated $C_1$-$C_{14}$ alkyl radical.

Preferably, D represents a linear, and saturated or unsaturated, $C_1$-$C_{22}$, preferably $C_1$-$C_{14}$, hydrocarbon-based chain.

According to one particular embodiment of the invention, p is equal to 0.

According to another particular embodiment of the invention, p is equal to 1.

Preferably, p is equal to 1 and G represents a linear or branched, preferably linear, and saturated or unsaturated $C_1$-$C_{12}$ alkylene radical.

Advantageously, the total number of carbon atoms of the D and G groups ranges from 2 to 31, preferentially from 6 to 17, more preferentially from 11 to 13.

According to one particular embodiment of the invention, the additive of formula (I) is obtained by virtue of a Diels-Alder reaction between a diene compound and a dienophilic compound (for more information, see Breuer, T. E., (2000) "Dimer Acids", Kirk-Othmer Encyclopedia of Chemical Technology).

Advantageously, said diene compound is a polyunsaturated fatty acid, that is to say a fatty acid comprising at least two double bonds.

Said polyunsaturated fatty acids are preferably polyunsaturated fatty acids comprising from 2 to 5 unsaturations, preferably from 2 to 4 unsaturations and more preferably 2 or 3 unsaturations, and comprising from 5 to 36 carbon atoms ($C_5$ to $C_{36}$), preferentially from 5 to 24 carbon atoms ($C_5$ to $C_{24}$), more preferentially from 10 to 22 carbon atoms ($C_{10}$ to $C_{22}$), even more preferentially from 16 to 18 carbon atoms ($C_{16}$ to $C_{18}$), and particularly preferably 18 carbon atoms.

Among said unsaturated fatty acids, mention may for example be made of sorbic acid and arachidonic, linoleic and linolenic fatty acids. For the latter, the Diels-Alder reaction is then preceded by an intramolecular thermal rearrangement of the double bonds so as to have a conjugated structure capable of the reaction, according to the conventional techniques known to those skilled in the art.

Advantageously, said dienophilic compound is chosen from carboxylic, dicarboxylic, sulfonic, disulfonic, phosphonic and diphosphonic acids and acid anhydrides, said acids and anhydrides comprising at least one double bond, preferably just one double bond.

Preferably, said dienophilic compound is a compound comprising from 3 to 5 carbon atoms, preferably from 3 to 4 carbon atoms.

As dienophilic compound, mention may for example be made of acrylic acid, methacrylic acid, crotonic acid, isocrotonic acid, angelic acids, tiglic acids, maleic acid, malic anhydride, vinylsulfonic acid, 2-propene-1-sulfonic acid and vinylphosphonic acid.

Preferably, said additive of formula (I) is chosen from the products obtained by reacting a linoleic acid with acrylic acid, maleic acid or maleic anhydride, or alternatively by reacting a linolenic acid with acrylic acid, maleic acid or maleic anhydride. It is also possible to envision reacting one or more diene mixture(s), such as for example mixtures of tall oil fatty acids (TOFAs) with one or more dienophile(s), as previously described, for example such as acrylic acid, maleic acid or maleic anhydride.

Preferably, said additive of formula (I), or formula (II), is chosen from 6-carboxy-4-hexyl-2-cyclohexene-1-octanoic acid, 5-carboxy-4-hexyl-2-cyclohexene-1-octanoic acid, 6-carboxy-4-pentyl-2-cyclohexene-1-nonanoic acid, 5-carboxy-4-pentyl-2-cyclohexene-1-nonanoic acid, and mixtures thereof; 6-carboxy-6-methyl-4-hexyl-2-cyclohexene-1-octanoic acid, 5-carboxy-5-methyl-4-hexyl-2-cyclohexene-1-octanoic acid, 6-carboxy-6-methyl-4-pentyl-2-cyclohexene-1-nonanoic acid, 5-carboxy-5-methyl-4-pentyl-2-cyclohexene-1-nonanoic acid, and mixtures thereof; 6-sulfo-4-hexyl-2-cyclohexene-1-octanoic acid, 5-sulfo-4-hexyl-2-cyclohexene-1-octanoic acid, 6-sulfo-4-pentyl-2-cyclohexene-1-nonanoic acid, 5-sulfo-4-pentyl-2-cyclohexene-1-nonanoic acid, and mixtures thereof; 6-phosphono-4-hexyl-2-cyclohexene-1-octanoic acid, 5-phosphono-4-hexyl-2-cyclohexene-1-octanoic acid, 6-phosphono-4-pentyl-2-cyclohexene-1-nonanoic acid, 5-phosphono-4-pentyl-2-cyclohexene-1-nonanoic acid, and mixtures thereof; 5,6-carboxy-4-hexyl-2-cyclohexene-1-octanoic acid, 5,6-carboxy-4-pentyl-2-cyclohexene-1-nonanoic acid, 5-carboxylic anhydride-4-hexyl-2-cyclohexene-1-octanoic acid, 5-carboxylic anhydride-4-pentyl-2-cyclohexene-1-nonanoic acid, and mixtures thereof; preferably from 6-carboxy-4-hexyl-2-cyclohexene-1-octanoic acid, 5-carboxy-4-hexyl-2-cyclohexene-1-octanoic acid, and a mixture thereof.

According to one particular embodiment of the invention, the additive of formula (II) is obtained by hydrogenation of the additive of formula (I).

Preferably, the amount of said additive of formula (I), or of formula (II), represents from 0.1% to 5% by weight, preferentially from 0.1% to 1% by weight, relative to the total weight of the composition.

The composition as previously defined can be prepared according to any method known to those skilled in the art, for example by adding the additive of formula (I), or of formula (II), as previously defined, to a bitumen, then mixing the bitumen and said additive.

Another subject of the invention is a bituminous emulsion comprising at least one bitumen, at least one additive of formula (I) or of formula (II), as previously defined, and at least one aqueous phase optionally containing at least one surfactant.

The emulsification is preferably carried out under a high shear. This emulsification under high shear can be performed using any apparatus known to those skilled in the art. By way of nonlimiting example, mention may be made of devices of colloid mill type, of which that of the Atomix® brand name is a representative.

Preferably, the amount of bitumen represents from 50% to 90% by weight, preferentially from 50% to 70%, more preferentially from 60% to 70% by weight, relative to the total weight of the bituminous emulsion.

Advantageously, the amount of additive of formula (I) as previously defined represents from 0.1% to 5% by weight, preferentially from 0.1% to 3% by weight, more preferentially from 0.1% to 2%, even more preferentially from 0.2% to 1.5% by weight, even more preferentially from 0.3% to 1% by weight, relative to the total weight of the bituminous emulsion.

According to one particular embodiment of the invention, the bituminous emulsion according to the invention comprises one or more surfactants, preferably cationic and/or nonionic surfactants, more preferentially cationic surfactants, chosen from, by way of nonlimiting examples, alkylamidopolyamines, alkylimidazolines and alkylimidazo(poly)amines, lignin amines, fatty-chain alkylamido(poly) amines, fatty-chain alkylpolyamines, products from reaction between fatty carboxylic acid(s) or plant oil(s) and polyalkylenepolyamines. The polyalkylenepolyamines may be, by way of nonlimiting examples, dimethylaminopropylamine, N-aminoethylpiperazine, diethylenetriamine, triethylenetramine, tetraethylenepentamine and pentaethylenehexamine The nonionic surfactants that may be added to the bituminous emulsion are well known to those skilled in the art and can be chosen from, by way of nonlimiting examples, polyalkoxylated fatty alcohols, polyalkoxylated nonylphenols or other polyalkoxylated compounds, alkylpolyglucosides, ethylene oxide/propylene oxide block copolymers having a molar mass $M_w$ of about 4500 g/mol and an ethylene oxide/(ethylene oxide+propylene oxide) weight ratio of about 40%, such as those sold by the company BASF under the generic name Pluronic®, and for example Pluronic® P94, and the like.

Advantageously, the bituminous emulsion according to the invention comprises one or more additives, other than those of formula (I) and of formula (II), commonly used in the field, among which mention may be made, in a nonlimiting manner, of viscosifying agents, natural or synthetic latexes, thickeners, fluxes, plasticizers, and also any other additive which makes it possible to adjust the properties of the emulsion, such as the process additives mentioned in patent EP 1 057 873, for example lignins, polymers, salifying agents, alcohols, in particular fatty alcohols, and the like. It is clearly understood that the additive(s) mentioned above can be incorporated into the composition according to the invention, or else one or more of the additives mentioned above can be incorporated into the bituminous composition before the addition of the water for the formation of the emulsion, or after the addition of the water.

A subject of the invention is also a process for producing a bituminous emulsion as previously defined, comprising at least one step of mixing:
at least one additive of formula (I), or formula (II), as previously defined,
a bitumen, and
an aqueous phase optionally containing at least one surfactant.

Said mixing step is preferably carried out under a high shear.

Advantageously, said process for producing the bituminous emulsion according to the invention is carried out according to the methods well known to those skilled in the art, and for example as described in the manual "Les émulsions de bitume" ["Bitumen emulsions"] published by the Revue Générale des Routes et des Aérodromes [General Review of Roads and Aerodromes], RGRA, (2006).

According to one preferred embodiment of the invention, said process comprises the following successive steps:
mixing said additive of formula (I), or formula (II), and a bitumen; then
mixing an aqueous phase optionally containing at least one surfactant and the solution obtained at the end of the mixing of the bitumen and said additive.

According to one example of implementation of the process according to the invention, a mixture of a bitumen and of at least one additive of formula (I), or formula (II), as previously defined, is prepared at a temperature ranging from 120 to 160° C., with stirring with for example a mixer of Rayneri type well known to those skilled in the art. An aqueous phase is also prepared, at ambient temperature, or with slight heating (from 40° C. to 50° at most), by mixing at least one cationic surfactant which may be, by way of example, of alkylamidopolyamine type (for example Polyram® L930 sold by the company CECA S.A.) with an acid of any type known to those skilled in the art. Preferably, said acid is a strong acid, by way of indication and in a nonlimiting way a strong mineral acid, preferably chosen from hydrochloric acid and phosphoric acid, without this list being limiting.

The composition obtained at the end of the mixing of the bitumen with said additive (temperature of the composition ranging for example from 140° C. to 160° C.) is then mixed under a high shear with the aqueous phase.

According to another preferred embodiment of the invention, said process comprises the following successive steps:
mixing said additive of formula (I), or formula (II), and an aqueous phase optionally containing at least one surfactant; then
mixing the solution obtained at the end of the mixing of the aqueous phase and of said additive, with the bitumen.

According to one example of implementation of the process according to the invention, a mixture of at least one additive of formula (I) as previously defined in an aqueous phase, typically water, containing a cationic surfactant of alkylamidopolyamine type (for example Polyram® L930 sold by the company CECA S.A.) is prepared, at ambient temperature, or with slight heating (from 40° C. to 50° C. at most), then this mixture is acidified (to a pH ranging from 1 to 5 and preferably from 2 to 4) by adding at least one acid of any type known to those skilled in the art. Preferably, said acid is a strong acid, by way of indication and in a nonlimiting way a strong mineral acid, preferably chosen from hydrochloric acid and phosphoric acid, without this list being limiting.

The solution obtained at the end of the mixing of the aqueous phase with said additive is then mixed under a high shear with at least one hot bitumen (bitumen temperature ranging for example from 140° C. to 160° C.).

Another subject of the invention is a cold-poured mix comprising at least one bituminous emulsion as previously defined, and aggregates.

Advantageously, said aggregates are of any type known to those skilled in the art. Among the aggregates that can be used for the cold-poured mixes according to the invention, mention may in particular be made, in a nonlimiting manner, of aggregates of mineralogical nature, for example of volcanic nature, such as granites or porphyries, of metamorphic nature, such as schists or gneisses, of sedimentary nature of siliceous type, such as silexes or quartzites, and of carbonated type, such as limestones or dolomites, but also mix aggregates (such as recycled asphalt pavement (RAP)), clinkers, crushed concretes, and the like, and also mixtures of such aggregates. These aggregates may of course have cement and/or lime added to them, according to the techniques known to those skilled in the art.

The invention also relates to the use of the additive of formula (I) or formula (II) as previously defined, for producing a cold-poured mix, as previously defined.

The invention also relates to the use of the additive of formula (I) or formula (II) as previously defined, for accelerating the increase in cohesion of a cold-poured mix as mentioned above.

The invention also relates to the use of the composition as previously defined, for accelerating the increase in cohesion of a cold-poured mix as mentioned above.

The invention is illustrated by the following examples, which are not in any way limiting.

EXAMPLES

Example 1

1. Preparation of Three Bituminous Emulsions

Three bituminous emulsions are produced with an emulsification pilot of the Emulbitume® brand name, equipped with a colloid mill of Atomix C type.

The three bituminous emulsions contain 60% by weight of bitumen, having a 70/100 penetrability, originating from the Total Grandpuits refinery, relative to the total weight of the emulsion.

The coating emulsions prepared are slow coating emulsions of C60B6 type according to the standard NF EN 13808 of August 2013.

The aqueous phase is prepared by mixing:
25 g of emulsifier of fatty alkylamidopolyamine type having the name Polyram® L920 sold by the company CECA S.A.;
1947 g of water;
28 g of 32% hydrochloric acid.

The composition of the three bituminous emulsions is indicated in table 1 below (the percentages are expressed relative to the total weight of the emulsion):

TABLE 1

| Emulsion type | Emulsion 1 (comp.) | Emulsion 2 (comp.) | Emulsion 3 (inv.) |
|---|---|---|---|
| bitumen (% by weight) | 60 | 60 | 60 |
| aqueous phase (% by weight) | qs | qs | qs |
| Pripol 1017 ® Polymerized fatty acid (% by weight) | — | 0.6 | — |
| Cecabase ® FC + Additive (% by weight) | — | — | 0.6 |

The additive Cecabase® FC+ comprises 45% by weight of oleic acid and 55% by weight of a mixture comprising 6-carboxy-4-hexyl-2-cyclohexene-1-octanoic acid and 5-carboxy-4-hexyl-2-cyclohexene-1-octanoic acid.

The polymerized fatty acid Pripol 1017® comprises, according to the technical sheet from the supplier Croda, approximately 2% by weight of fatty acid monomer, 78% by weight of fatty acid dimer and 20% by weight of fatty acid trimer.

The additives (the polymerized fatty acid Pripol 1017® for emulsion 2, and the additive Cecabase® FC+ for emulsion 3) are introduced into the hot bitumen, heated to approximately 140° C., with stirring. The mixture is left to stir for 15 minutes for homogenization before emulsification.

The emulsification is carried out in a standard manner, with an Emulbitume pilot operating continuously at the flow rate of 60 liters/h. The bitumen/aqueous phase mixture at the weight ratio of 60/40 is introduced into an Atomix C by means of two separate circuits fed by two pumps.

2. Preparation of Three Cold-Poured Mixes

Three cold-poured mixes are prepared from the three bituminous emulsions mentioned above.

The three mixes were prepared with aggregates originating from Piasek quarry in Poland. The granular mixture is a mixture of 50% by weight of aggregates of 0-2 cm particle-size class and 50% by weight of aggregates of 2-8 cm particle-size class.

The amount of water added to the dry aggregates varies from 7 to 8 g and is adjusted according to the system so as to maintain a kneading time of around 100±10 seconds.

In the present examples, the term "kneading time" is intended to mean the time during which the mixture comprising the aggregates, the cement, the water and the emulsion remains fluid with stirring.

The composition of the three cold-poured mixes is indicated in table 2 below:

TABLE 2

| Mix type | Mix 1 (comp.) | Mix 2 (comp.) | Mix 3 (inv.) |
|---|---|---|---|
| Emulsion 1 (g) | 12 | — | — |
| Emulsion 2 (g) | — | 12 | — |
| Emulsion 3 (g) | — | — | 12 |
| Granular mixture (g) | 100 | 100 | 100 |
| Cement (CEM II) | 1 | 1 | 1 |
| Water (g) | 7 | 8 | 8 |

3. Evaluation of the Internal Strength of the Three Cold-Poured Mixes

The internal cohesion of each of the three mixes is evaluated by means of the HCT test, "Hilt Cohesion Test", described in the IDRRIM [Institute for Roads, Streets and Infrastructures for Mobility] guide on "Matériaux Bitumineux Coulés à Froid" ["Cold-Poured Bituminous Materials"], (2015).

This test makes it possible to evaluate the tensile strength and flexural strength of the mix tested.

Test specimens of cold-poured mixes (CPMs), also known as CPBMs (Cold-Poured Bituminous Materials) 120×120×15 mm in size are produced by pouring 400 g of cold-poured mix into a 120×120 mm mold with removable edges. After the mix has set, the edges of the mold are carefully removed and the test specimen is left to mature at ambient temperature for a given time (in this case 2 h).

The test was carried out on a table, the principle being to place half of the test specimen under vacuum while the other half is kept on a support. The test specimen is positioned at the edge of the table on a plastic support in two equal parts not fixed together. A counterweight is placed on the part which remains on the table. The other half of the test specimen is slipped over the vacuum, and the support under this part is removed.

The time required to break the mix after half of the test specimen has been placed above the vacuum is then measured. The result (in seconds) represents the HCT cohesion value after a defined maturing time, under known temperature and hygrometry conditions. The longer the time (under equivalent maturing conditions), the stronger the cold-poured mix and thus the more advanced the increase in cohesion.

The results for breaking time after two hours of maturing at 20° C. that were obtained on the cold-poured mixes produced from the three emulsions are presented in table 3 below:

TABLE 3

| Mix type | Mix 1 (comp.) | Mix 2 (comp.) | Mix 3 (inv.) |
|---|---|---|---|
| Breaking time (seconds) | 5 | 180 | 260 |

The breaking time of mix 3 according to the invention is significantly longer than the breaking time of the other two mixes.

A mix comprising the additive of formula (I) according to the invention thus has a very high cohesion after two hours of maturing, better than that obtained for a mix without additive or a mix comprising an additive described in the prior art, such as a polymerized fatty acid.

Example 2

1. Preparation of Three Bituminous Emulsions

Three bituminous emulsions are produced with an emulsification pilot of the Emulbitume® brand name, equipped with a colloid mill of Atomix C type.

The three bituminous emulsions contain 60% by weight of bitumen, having a 70/100 penetrability, originating from the Total Gonfreville refinery, relative to the total weight of the emulsion.

The coating emulsions prepared are slow coating emulsions of C60B6 type according to the standard NF EN 13808 of August 2013.

The amount of emulsifier in the emulsion is 8 kg/t of a tallow polyamine having the trade name Polyram® S, and 8 kg/t of a co-emulsifier of quaternary ammonium type sold under the name Stabiram® MS8 by the company CECA S.A.

The pH of the aqueous phase was adjusted to 2 with 32% hydrochloric acid.

The composition of the three bituminous emulsions is indicated in table 4 below (the percentages are expressed relative to the total weight of the emulsion):

TABLE 4

| Emulsion type | Emulsion 4 (comp.) | Emulsion 5 (inv.) | Emulsion 6 (inv.) |
|---|---|---|---|
| Bitumen (% by weight) | 60 | 60 | 60 |
| aqueous phase (% by weight) | qs | qs | qs |
| Cecabase ® FC + Additive (% by weight) | — | 0.6 | 0.6 |
| Introduction of the Cecabase ® FC + additive into | — | the bitumem | the aqueous phase |

During the preparation of emulsion 5 according to the invention, the Cecabase® FC+ additive is introduced into the hot bitumen, heated to approximately 140° C., with stirring. The mixture is left to stir for 15 minutes for homogenization before emulsification.

The aqueous phase is prepared at 40° C. by mixing the tallow polyamine Polyram® S, the co-emulsifier Stabiram® MS8, and the hydrochloric acid.

During the preparation of emulsion 6 according to the invention, the Cecabase® FC+additive is introduced into the aqueous phase, prepared by mixing the tallow polyamine Polyram® S, the co-emulsifier Stabiram® MS8, and the hydrochloric acid.

The bitumen is heated to approximately 140° C. before emulsification.

In any event, the emulsification is carried out in a standard manner, with an Emulbitume pilot operating continuously at the flow rate of 60 liters/h. The bitumen/aqueous phase mixture at the weight ratio of 60/40 is introduced into an Atomix C by means of two separate circuits fed by two pumps.

2. Preparation of Four Cold-Poured Mixes

The four mixes were prepared with siliceous aggregates originating from the Vignat quarry. The granular mixture is a mixture of 50% by weight of aggregates of 0-2 cm particle-size class and 50% by weight of aggregates of 2-6 cm particle-size class.

The amount of water added to the dry aggregates varies from 9 to 10 g and is adjusted according to the system so as to maintain a kneading time of around 90±10 seconds.

Mix 4 (comparative) is prepared from emulsion 4.

Mix 5 (comparative) is prepared from emulsion 4, and 0.6% by weight of Cecabase® FC+ was added to the aggregate pre-wetting water in the form of a 10% suspension in water.

Mix 6 according to the invention is prepared from emulsion 5. Mix 7 according to the invention is prepared from emulsion 6.

The composition of the four cold-poured mixes is indicated in table 5 below:

TABLE 5

| Mix type | Mix 4 (comp.) | Mix 5 (comp.) | Mix 6 (inv.) | Mix 7 (inv.) |
|---|---|---|---|---|
| Emulsion 4 (g) | 12 | — | — | — |
| Emulsion 4 (g) | — | 12 | — | — |
| Emulsion 5 (g) | — | — | 12 | — |
| Emulsion 6 (g) | — | — | — | 12 |
| Cecabase ® FC + Additive** (% by weight) | — | 0.6 | — | — |
| Granular mixture (g) | 100 | 100 | 100 | 100 |
| Cement (CEM II) (g) | 0.5 | 0.5 | 0.5 | 0.5 |
| Water (g) | 9 | 9 | 10 | 9 |

**The additive was introduced into the aggregate pre-wetting water, as indicated above.

3. Evaluation of the Increase in Cohesion of the Four Cold-Poured Mixes

The increase in cohesion of each of the four mixes is evaluated by means of a Benedict cohesion tester according to the standard ASTM D3910 (1998). The aggregates, the cement, the introduced water and the emulsion are mixed with a spatula for 40 seconds. The mixture is poured into a mold, as described in the standard, on a bituminous support. After breaking of the emulsion, the mold is carefully removed, and the test specimen thus produced is left to mature at ambient temperature. The resistive torque of the test specimens is measured with the cohesion tester at regular intervals. The higher the torque, the better the cohesion of the mix.

This test makes it possible to determine a time to reopening the road to traffic by measuring the maturing time required to obtain a threshold torque value. It is generally accepted by those skilled in the art that opening the road to traffic is possible at about a value of 20 kg·cm.

The torques are measured at regular intervals for a period of 90 minutes of maturing at 20° C. The results are presented in table 6 below:

TABLE 6

| Mix type | Mix 4 (comp.) | Mix 5 (comp.) | Mix 6 (inv.) | Mix 7 (inv.) |
|---|---|---|---|---|
| Torque (in kg · cm) after 15 minutes | 10 | 12 | 16 | 15 |
| Torque (in kg · cm) after 30 minutes | 16 | 18 | 20 | 20 |
| Torque (in kg · cm) after 60 minutes | 19 | 20 | 22 | 21 |
| Torque (in kg · cm) after 90 minutes | 21 | 22 | 24 | 22 |

Thus, mixes 6 and 7, comprising the additive of formula (I) according to the invention, have a torque of 20 kg·cm after only 30 minutes of maturing. In particular, mix 6, comprising emulsion 5 which was prepared by introducing the additive of formula (I) into the bitumen, gives the best results.

The results thus clearly indicate that the use of the additive of formula (I) according to the invention makes it possible to shorten the time to opening the road to traffic by at least 30 minutes, compared with the solutions known from the prior art.

The invention claimed is:

1. A composition comprising at least one bitumen and at least one additive chosen from the compounds of formula (I) below or the compounds of formula (II) below:

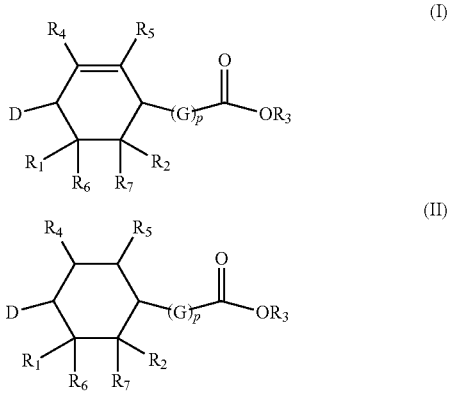

wherein:
$R_1$ and $R_2$, which may be identical or different, represent, independently of one another, a group chosen from a hydrogen atom, a group $-(A1)_{q1}-S(O)_2OR_8$, a group $(A2)_{q2}-P(O)(OR_9)_2$ and a group $(A3)_{q3}-C(O)OR_{10}$,
$R_8$, $R_9$ and $R_{10}$, which may be identical or different, represent, independently of one another, a hydrogen atom or a linear or branched, saturated or unsaturated $C_1$-$C_{22}$ alkyl radical,
A1, A2 and A3, which may be identical or different, represent, independently of one another, a linear or branched $C_1$-$C_4$ alkylene radical,
q1, q2 and q3, which may be identical or different, represent, independently of one another, an integer equal to 0 or 1,
or $R_1$ and $R_2$ form, with the carbon atoms to which they are attached, a heterocycle comprising 5 ring members, wherein $R_1$ and $R_2$ do not simultaneously represent a hydrogen atom;
$R_3$ represents a hydrogen atom;
$R_4$ and $R_5$, which may be identical or different, represent, independently of one another, a hydrogen atom or a linear or branched, saturated or unsaturated $C_1$-$C_{22}$ alkyl radical;
$R_6$ and $R_7$, which may be identical or different, represent, independently of one another, a hydrogen atom or a linear or branched, saturated or unsaturated $C_1$-$C_4$ alkyl radical;
D represents a hydrogen atom or a linear or branched, saturated or unsaturated $C_1$-$C_{22}$ alkyl radical;
G represents a linear or branched, saturated or unsaturated $C_1$-$C_{22}$ alkylene radical;
p is an integer equal to 0 or 1.

2. The composition as claimed in claim 1, wherein $R_1$ and $R_2$ form, with the carbon atoms to which they are attached, the group of formula (III) below:

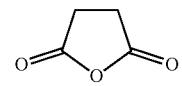

3. The composition as claimed in claim 1, wherein $R_4$ and $R_5$ simultaneously represent a hydrogen atom.

4. The composition as claimed in claim 1, wherein $R_6$ and $R_7$, which may be identical or different, represent, independently of one another, the hydrogen atom, the methyl radical or the ethyl radical.

5. The composition as claimed in claim 1, wherein said additive of formula (I), or formula (II), is chosen from 6-carboxy-4-hexyl-2-cyclohexene-1-octanoic acid, 5-carboxy-4-hexyl-2-cyclohexene-1-octanoic acid, 6-carboxy-4-pentyl-2-cyclohexene-1-nonanoic acid, 5-carboxy-4-pentyl-2-cyclohexene-1-nonanoic acid, and mixtures thereof; 6-carboxy-6-methyl-4-hexyl-2-cyclohexene-1-octanoic acid, 5-carboxy-5-methyl-4-hexyl-2-cyclohexene-1-octanoic acid, 6-carboxy-6-methyl-4-pentyl-2-cyclohexene-1-nonanoic acid, 5-carboxy-5-methyl-4-pentyl-2-cyclohexene-1-nonanoic acid, and mixtures thereof; 6-sulfo-4-hexyl-2-cyclohexene-1-octanoic acid, 5-sulfo-4-hexyl-2-cyclohexene-1-octanoic acid, 6-sulfo-4-pentyl-2-cyclohexene-1-nonanoic acid, 5-sulfo-4-pentyl-2-cyclohexene-1-nonanoic acid, and mixtures thereof; 6-phosphono-4-hexyl-2-cyclohexene-1-octanoic acid, 5-phosphono-4-hexyl-2-cyclohexene-1-octanoic acid, 6-phosphono-4-pentyl-2-cyclohexene-1-nonanoic acid, 5-phosphono-4-pentyl-2-cyclohexene-1-nonanoic acid, and mixtures thereof; 5,6-carboxy-4-hexyl-2-cyclohexene-1-octanoic acid, 5,6-carboxy-4-pentyl-2-cyclohexene-1-nonanoic acid, 5-carboxylic anhydride-4-hexyl-2-cyclohexene-1-octanoic acid, 5-carboxylic anhydride-4-pentyl-2-cyclohexene-1-nonanoic acid, and mixtures thereof.

6. The composition as claimed in claim 1, wherein the amount of the additive of formula (I) or of formula (II), represents from 0.1% to 5% by weight, relative to the total weight of the composition.

7. A bituminous emulsion comprising at least one bitumen, at least one additive of formula (I) or of formula (II) as defined in claim 1, and at least one aqueous phase optionally containing at least one surfactant.

8. The bituminous emulsion as claimed in claim 7, wherein the amount of the additive of formula (I) or of formula (II) represents from 0.1% to 5% by weight, relative to the total weight of the emulsion.

9. A process for producing a bituminous emulsion as defined in claim 7, comprising at least one step of mixing:
- at least one additive of formula (I) or of formula (II);
- a bitumen; and
- an aqueous phase optionally containing at least one surfactant.

10. The process as claimed in claim 9, comprising the following successive steps:
- mixing the additive of formula (I) or of formula (II), and a bitumen; then
- mixing an aqueous phase optionally containing at least one surfactant and the solution obtained at the end of the mixing of the bitumen and the additive.

11. The process as claimed in claim 9, comprising the following successive steps:
- mixing the additive of formula (I) or of formula (II), and an aqueous phase optionally containing at least one surfactant; then
- mixing the solution obtained at the end of the mixing of the aqueous phase and of the additive, with the bitumen.

12. A cold-poured mix comprising at least one emulsion as defined in claim 7 and aggregates.

13. A method of producing a cold-poured mix as defined in claim 12, comprising combining the emulsion and the aggregates.

* * * * *